Oct. 7, 1958 R. DEMING 2,854,884
HEADLIGHT TESTER
Filed March 16, 1955 4 Sheets-Sheet 2
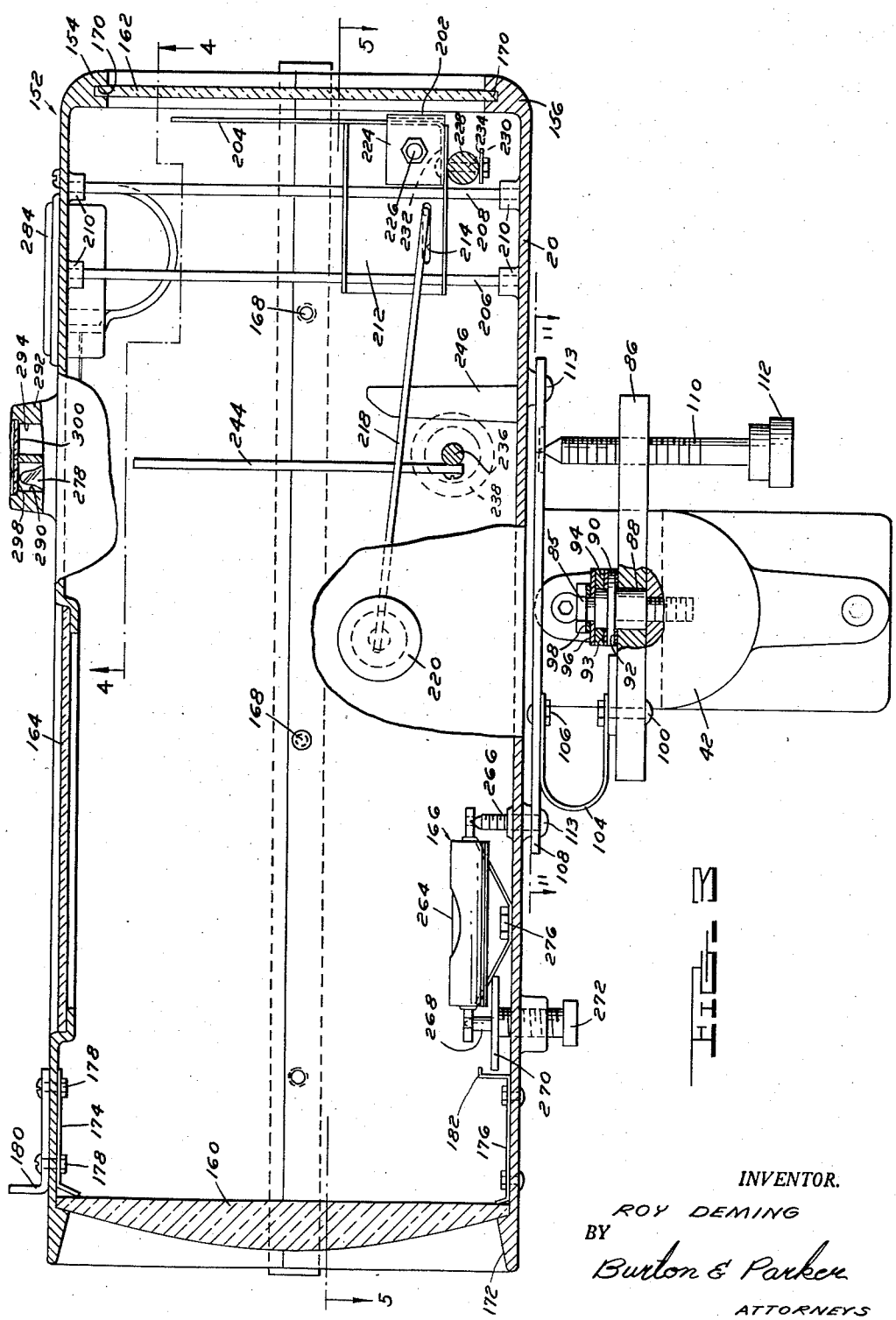
INVENTOR.
ROY DEMING
BY
Burton & Parker
ATTORNEYS Oct. 7, 1958 R. DEMING 2,854,884
HEADLIGHT TESTER
Filed March 16, 1955 4 Sheets-Sheet 3
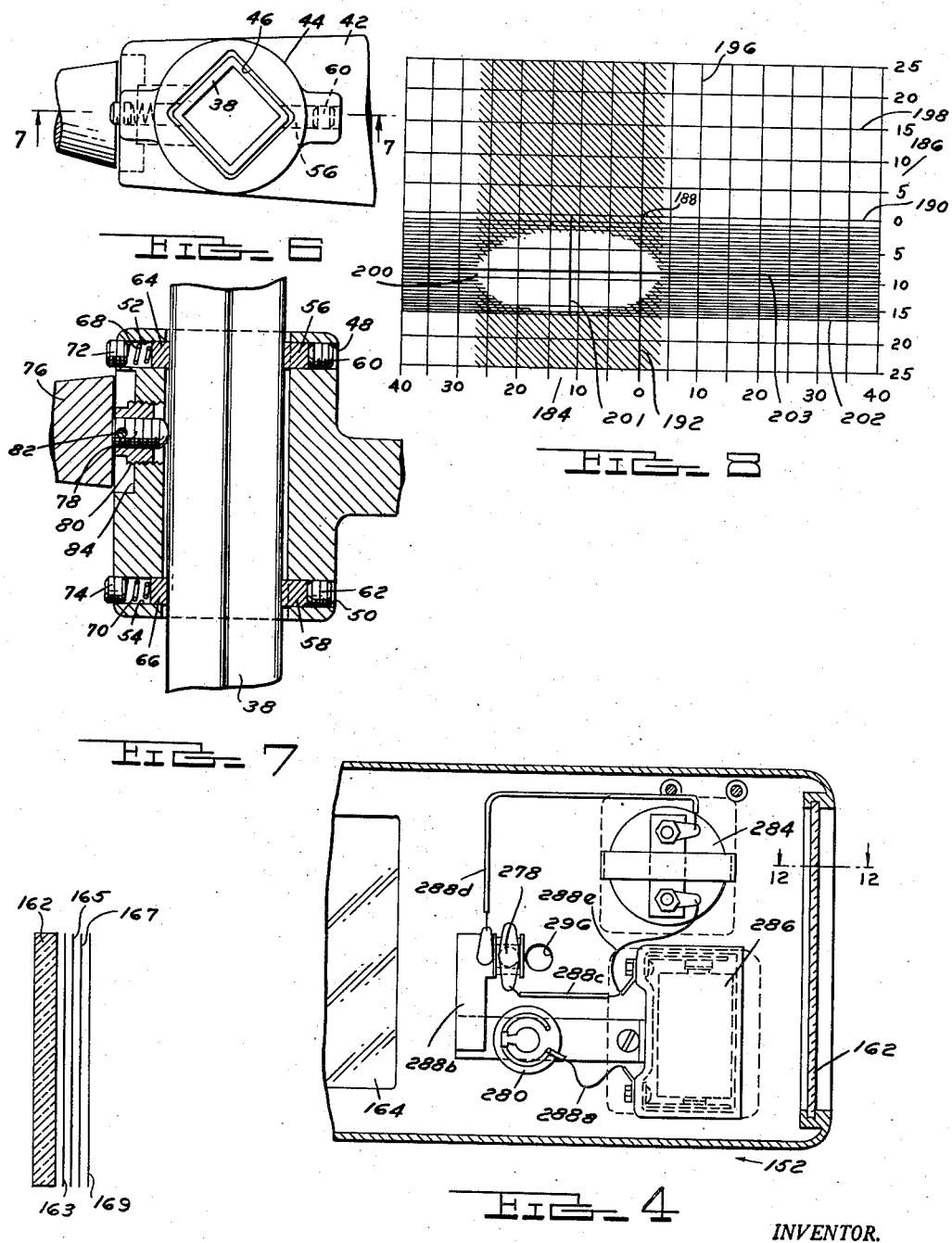
INVENTOR.
ROY DEMING
BY
Burton & Parker
ATTORNEYS Oct. 7, 1958
R. DEMING
2,854,884
HEADLIGHT TESTER
Filed March 16, 1955
4 Sheets-Sheet 4
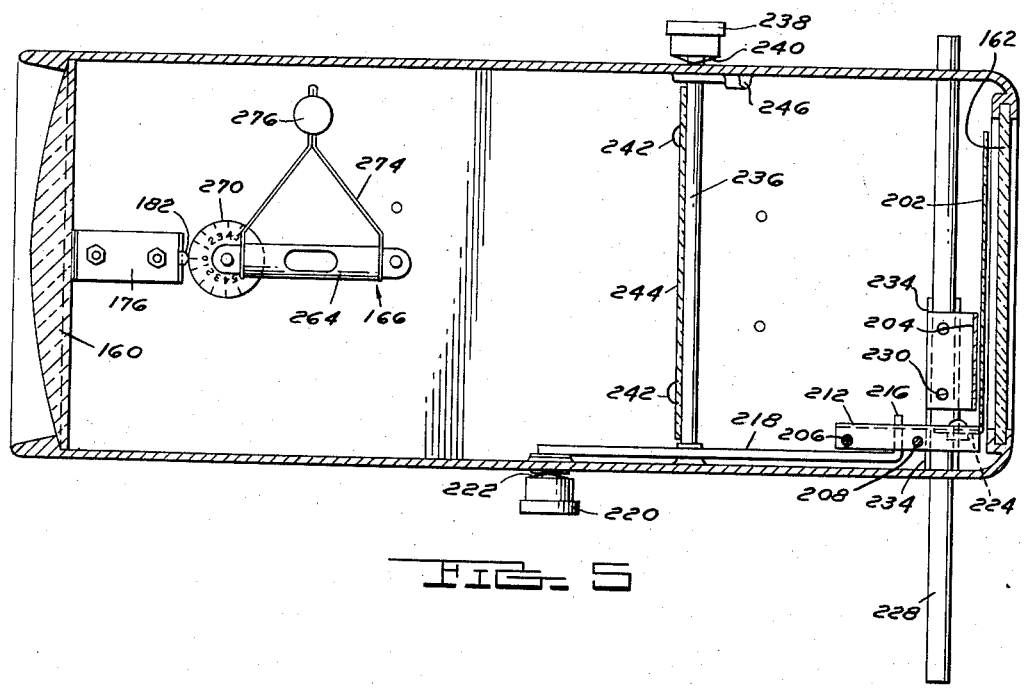
FIG. 5
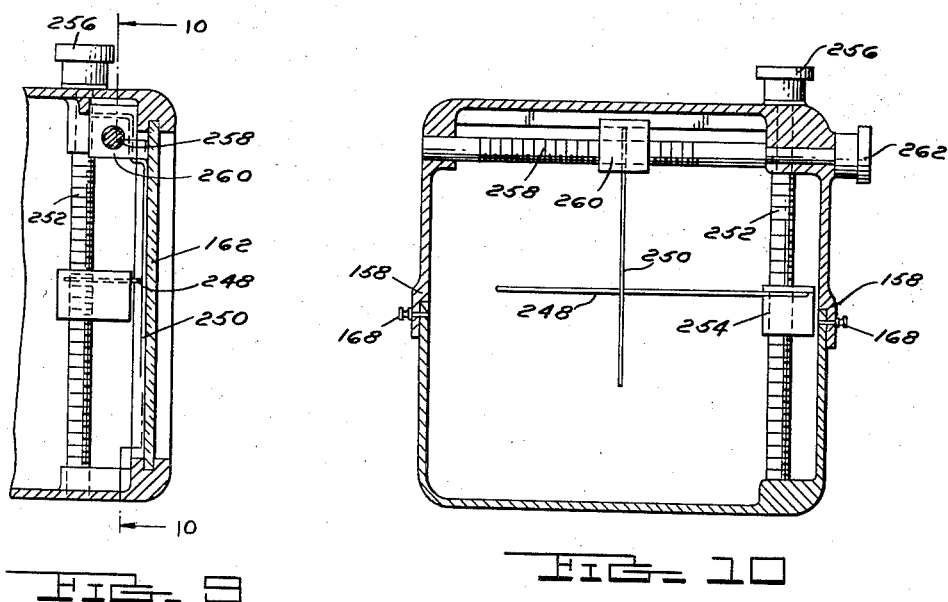
FIG. 9
FIG. 10
INVENTOR.
ROY DEMING
BY
Burton & Parker
ATTORNEYS

United States Patent Office 2,854,884
Patented Oct. 7, 1958

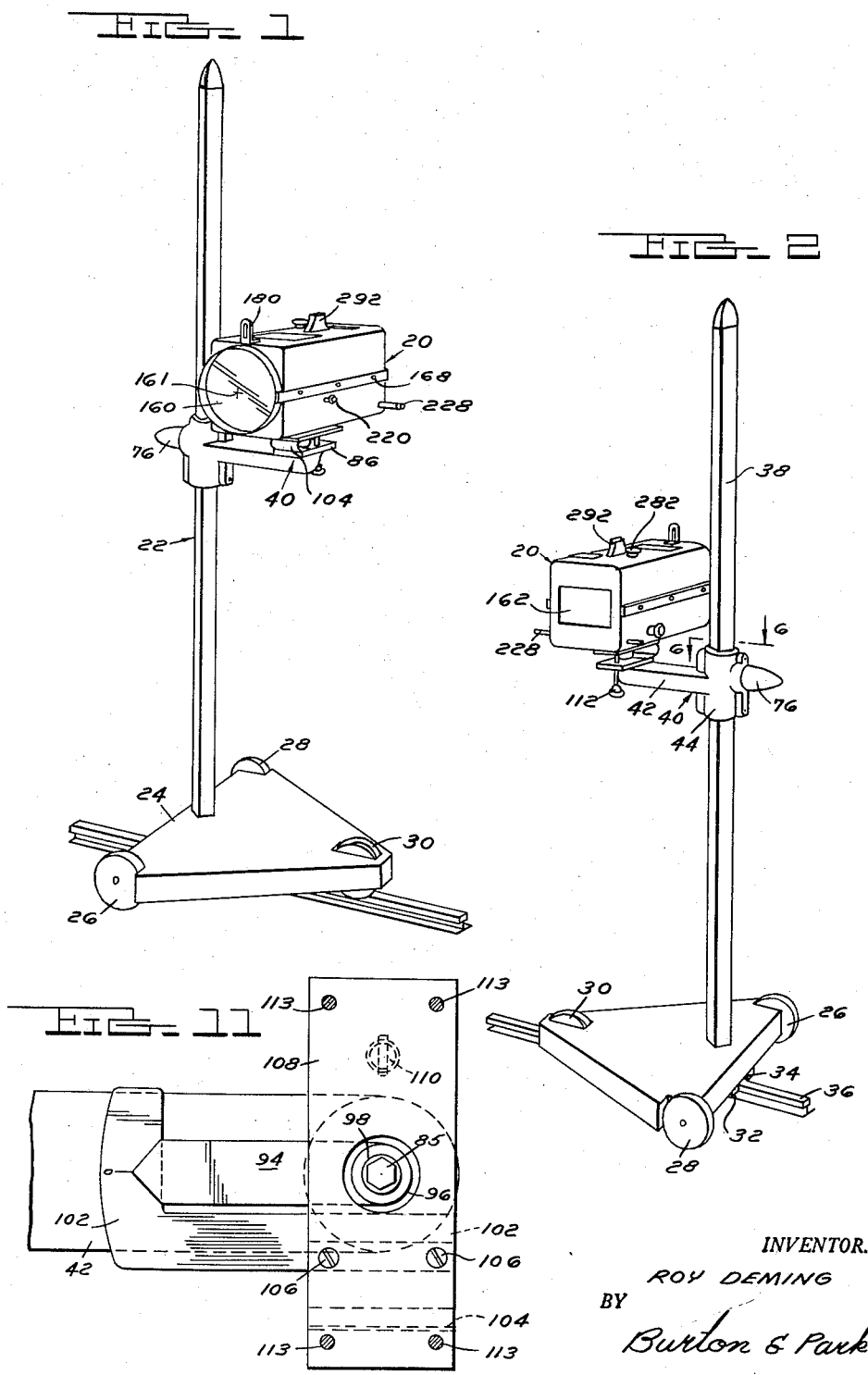

2,854,884
HEADLIGHT TESTER

Roy Deming, Jackson, Mich., assignor to Kent-Moore Organization, Inc., Detroit, Mich., a corporation of Michigan Application March 16, 1955, Serial No. 494,665

10 Claims. (Cl. 88—14)

This invention relates to devices for testing motor vehicle headlights, and particularly to a device for quickly and accurately determining the aim and candle power of light emitted by such headlights.

With the advent of state laws requiring periodic inspection of motor vehicles, and particularly the headlights thereof, together with the increased speed of motor vehicles and their widespread use at night time, it has become necessary to inspect both the direction of aim and the candle power of motor vehicle headlights at periodic intervals to maintain the headlights at the optimum standards of efficiency and safety. In those states having compulsory inspection laws, motor vehicles are received at an inspection station, at which a number of different tests are made of various parts and mechanisms of the vehicles. These tests must be accomplished with both accuracy and speed. To fit the needs of this accurate and rapid inspection, as it applies to vehicle headlights, I have provided a novel headlight tester of the character herein described, particularly well suited for use in both ordinary maintenance garages and the above mentioned state inspection stations.

An object of the invention is the provision of a headlight tester which is adapted to test both the direction of aim and the candle power of the light emitted from motor vehicle headlights or fog lights, with such arrangement and construction of parts that the tester yields accurate results with a minimum of manipulation and a minimum of experience by the operator of the tester.

Another object of the invention is the provision of a headlight tester of the character mentioned wherein the light emitted by a motor vehicle headlight disposed in front of the tester, enters the tester at one end and is focused on a screen at the other end, with the operator of the tester observing the light pattern focused on the screen while looking in the direction of the headlight being tested. The lens is adapted to focus the pattern of light emitted by a headlight on the screen, with the pattern thrown on the screen being similar to a pattern of light thrown on a screen located at substantially 25 feet from the headlight.

Another object of the invention is the provision in a headlight tester of movable pointer means disposed for adjustable movement across a headlight beam entering the tester, and by means of which pointer means the operator may accurately locate the center of the light beam intensity for comparison with a predetermined point with which the center of such beam intensity should be aligned for proper aim of the headlight.

A concomitant object is the provision in a headlight tester of the combination of a light diffusing screen calibrated along horizontal and vertical axes and upon which a headlight beam is focused in entering the tester, and a pair of pointers located adjacent the screen between the source of light and the screen and movable in angularly related directions to divide the beam at its center of intensity and indicate relative to the horizontal and vertical calibrations on the screen the co-ordinate center of such beam for comparison with the co-ordinates of a properly aimed beam. A related object of the invention is the provision in a tester of the character above mentioned of pointer means for determining the center of intensity of a headlight beam, which pointer means includes a pair of differently colored light filters movable in angularly related directions across a light beam between the source of light and the screen of the tester, with the filters being movable by the operator to such positions that he may balance the intensity of light at the edges of the filters, and when the light intensity is so balanced at the edges of the filters, he is assured that the center of the light beam intensity is located at the intersection of the filters.

Still another object of the invention is the provision in a tester of the above character of a shiftably mounted light filter disposed for interception of a headlight beam entering the tester and before the light beam strikes the screen and adapted to reduce the glare on the screen, with such filter being shiftable from a position of non-interception of the beam to a position of interception, and specifically to a position of interception where it will reflect a portion of the light beam striking it, angularly away from the normal path of the beam and into a candle power testing device.

Still another object of the invention is the provision in a headlight tester of the character described of a candle power testing device including a screen illuminable by a small quantity of light deflected from the normal light path of a headlight beam passing through the tester, with a light bulb disposed adjacent the path of this small quantity of deflected light, with the bulb connected in a circuit having a source of electric energy, a rheostat, and a current measuring device calibrated to read in candle power, whereby the operator of the tester may balance by use of the rheostat the intensity of light emitted by the bulb with the intensity of the deflected light, and thereupon read the candle power of the headlight beam directly from the suitably calibrated current measuring device.

Other objects, advantages, and meritorious features will more fully appear from the specification, claims, and accompanying drawing, wherein:

Fig. 1 is a perspective view of my improved tester mounted upon its supporting stand, and showing the front end of the tester and the headlight focusing lens;

Fig. 2 is similar to Fig. 1 but shows the other side of the tester supporting stand and the rear end of the tester and the calibrated light diffusing screen;

Fig. 3 is a vertical cross sectional view taken on a line extending longitudinally of the tester;

Fig. 4 is a cross sectional fragmentary view taken on the line 4—4 of Fig. 3;

Fig. 5 is a cross sectional view taken on the line 5—5 of Fig. 3;

Fig. 6 is a fragmentary top view taken along the line 6—6 of Fig. 2;

Fig. 7 is a cross sectional view taken on the line 7—7 of Fig. 6;

Fig. 8 depicts the light diffusing screen as the operator of the tester would see it during the testing of a headlight;

Fig. 9 is a cross sectional view through a modified form of the pointer means;

Fig. 10 is a cross sectional view taken on the line 10—10 of Fig. 9;

Fig. 11 is a cross sectional view taken on the line 11—11 of Fig. 3; and,

Fig. 12 is a cross sectional view of the screen taken on the line 12–12 of Fig. 4.

In carrying out the objects of my invention I have provided an improved headlight tester illustratively shown in perspective in Figs. 1 and 2. The tester includes a tester head generally indicated at 20 which is shown as mounted upon an improved supporting stand 22, having a triangular base portion or carriage 24 provided with wheels 26, 28, and 30. The under side of the base is provided with a pair of spaced apart ears 32 and 34 adapted to overlie opposite sides of a guide track 36 which is fastened to the floor at substantially right angles to the center line of an automobile positioned in front of the tester for testing of the headlights. The wheel 30 is peripherally notched to be received over the track 36, and such wheel and the ears 32 and 34 serve to guide the stand for straight line movement over the floor in front of a vehicle whose headlights are being tested.

It will be noted that the wheels 26 and 28 are positioned such that by grasping the upstanding post 38 of the stand 22, the stand may be tilted back to run on only the wheels 26 and 28. In this way the stand may be wheeled about from one testing station at one location in an automotive service garage to another location. There may be a number of tracks 36 located at different testing stations in a large garage, and the stand and tester head may be thus wheeled from one station to another and fitted upon the track at such station to test the headlights of a vehicle at the station.

The post or pillar 38 which extends upwardly from the standard is disposed at right angles to the plane of the base portion 24 and is polygonal in cross section, and preferably square. The post has a polished surface or may be chrome plated.

Received over the post for vertically adjustable movement is the tester head supporting bracket 40. The bracket has a horizontally extending arm portion 42 provided with and enlarged head portion 44. A hole 46 extends vertically through the head portion 44 and is of a shape to complement the cross sectional shaped post, but larger than the post, as shown in Figs. 6 and 7. To reduce the weight of the stand, the post 38 may be of hollow construction and the bracket 40 formed of aluminum. Four horizontally extending oppositely disposed threaded holes 48, 50, 52, and 54 extend through the head, bisecting opposite corners of the square hole 46 as shown in Figs. 6 and 7. Within holes 48 and 50 are disposed V-notched nylon or other type plastic bearing pins or buttons 56 and 58, backed up by threaded screws 60 and 62. The screws 60 and 62 are so adjusted that the post is spaced from the sides of the vertical hole 46.

Disposed in the holes 52 and 54 are V-notched nylon bearing pins or buttons 64 and 66 tensioned toward the post by springs 68 and 70 and screws 72 and 74. By adjusting the tension on springs 68 and 70 the bracket may be positioned on the post spaced from the side walls of the hole 46 and so held in spaced relation by the nylon button. If the post is of polished metal or chrome plated, the nylon buttons with their V notches received over opposite corners of the post give a very smooth sliding action to the bracket up and down the post, without any chattering or binding of the bracket on the post during such sliding movement. The springs 68 and 70 may be adjusted so that the bracket 40 slides slowly up and down the post. The springs also compensate for any irregularities in the surface of the post that might otherwise cause binding of the bracket on the post.

To adjustably position the bracket on the post in determined adjusted positions a locking device is provided which includes an aluminum handle portion 76 having a threaded stem 78. Threadedly received on the stem 78 is an internally and externally threaded collar 80, which may be formed of steel, with a pin 82 securing the collar on the stem to prevent relative rotation. The collar is received in a threaded countersunk hole 84, with the end of stem 78 adapted to bear against the post. Upon tightening or loosening of the locking device the bracket may be vertically shifted or held in an adjusted position on the post.

To mount the tester head 20 on bracket 40 a spring swivel support is provided constructed as hereinafter described and as shown in Figs. 3 and 11. The free end of bracket arm 42 is provided with a vertically threaded hole adapted to receive the bolt 85. The bolt extends through a swivel plate 86. The swivel plate bears against the arm 42. A collar 88, generally T-shaped in cross section, extends at its lower end through the swivel plate 86 and is adapted to bear at its lower end against the arm 42. The collar is provided with a peripheral shoulder 90 which is spaced from the swivel plate by a spring washer 92, which washer yieldingly resists swingable movement of the swivel plate about the collar 88. Just above the peripheral shoulder 90 is a second spring washer 93 which spaces the pointer 94 from the shoulder. A flat washer 96 and a lock washer 98 underlie the head of the bolt and cooperate with the bolt to urge the above elements together. The bolt 85 urges the collar against the arm 42 and prevents rotation of the collar relative to the arm. The pointer 94, because of the spring washer 93, is yieldingly swingably adjustable about the collar relative to the swivel plate 86.

Fastened to the swivel plate 86 by bolts 100 (only one of which is shown) are the L-shaped indicator plate 102 and the U-shaped spring hinge 104 (Figs. 3 and 11). Secured to the upper end of spring hinge 104 by bolts 106 is the tester head mounting plate 108. The spring hinge 104 tensions the mounting plate downwardly toward the swivel plate 86. A threaded vertical leveling screw 110 provided with a knob 112 extends in threaded engagement through the swivel plate to bear at its sharp end against the mounting plate 108. Upon adjustment of the leveling screw the angular position of the mounting plate may be varied to level a tester head mounted upon the plate 108. A tester head 20 may be secured to the mounting plate as by means of screws or the like 113. A description of the functioning of this spring swivel support is set forth in the description of the operation of the tester.

The headlight tester head 20 comprises an elongated box-like housing 152 which may be formed of an upper half 154 and a lower half 156, each of which may be made of plastic or light weight metal or some other suitable material. The upper half is provided with lip and shoulder equipments 158 which extend along the lower edge and are adapted to fit over and upon the upper edge of the lower half 156. The housing is closed at all sides except for the openings at the opposite ends wherein are disposed respectively a light condensing lens 160 and a screen 162. An opening through the top of the housing receives a transparent plate 164, through which the operator may observe the floor slope compensator indicated generally at 166. Screws having peripherally grooved heads 168, extend through the lip 158 and through the wall of the lower half of the housing and secure the two halves of the housing together.

The screen 162, which is coated on the inside with a thin translucent film of paint, is held in the opening at the rear end of the housing by a groove 170 which extends around the opening. The lens 160 is held in position at the front of the housing between the tapering shoulder 172, which extends around the opening, and the angle brackets 174 and 176. Bracket 174 is secured to the underside of the top of the housing by bolts 178 which also fasten a slotted front sight 180 on the outside of the housing along the center line thereof. The lower bracket 176 is bent to provide a pointer 182 for a purpose hereinafter described.

The lens 160 is provided at its center with a small cross 161 lying equidistant from the sides, floor, and top wall of the housing. The lens is adapted, when the tester is disposed in front of a motor vehicle headlight and adjacent the headlight, to focus the light beam on the screen 162. The scale extending along the horizontal and vertical edges of the screen, and marked on the screen as at 184 and 186 in Fig. 8, is adapted to indicate the displacement in inches of the "hot spot," or center of intensity, of the light beam from the correct aim of the headlight, as such displacement would be measured on a screen 25 feet from the headlight. In other words, the scale indicates in inches, the same displacement as would occur if the headlight beam were focused on a screen disposed 25 feet from the headlight. The center of the screen is indicated at 188 at the point of intersection of the heavy horizontal and vertical lines 190 and 192. The surface of the screen may also be provided with other horizontally and vertically extending lines 196 and 198 extending from the inch indications on the scale of the screen.

The screen 162 is a "two-way" screen, that is to say, the calibrations at 184 and 186 may be read from either side of the screen. While in Fig. 8 the screen is shown as it would be seen from outside the housing, it would appear just as it is shown if viewed from the inside of the housing, except that the vertically extending pointer 204, hereinafter mentioned, would cast its shadow on the other side of line 188. The screen may be viewed from inside the housing by looking down through the transparent plate 164 and toward the screen. In order to make the screen read properly from both inside and outside the housing, without the numbers along scales 184 and 186 appearing reversed, four coats of paint are applied to the inside surface of the screen. These coats of paint are represented by the four lines 163, 165, 167 and 169, shown in Fig. 12. The lines are shown separated for convenience in illustration and description. The first coat of paint that is applied is indicated at 163 and is a white paint stenciled on the glass of the screen 162 to indicate the numbers along the horizontal and vertical scales as shown in Fig. 8, and which numbers are readable from outside the housing. Next a coat of translucent gloss white paint, indicated at 165, is applied over coat 163. Over coat 165 is applied an opaque black paint, stenciled to indicate the grid lines 196 and 198, and is indicated at 167. Over this coat is applied a stencil layer of white paint which shows the numbers of horizontal and vertical scales similar to scales 184 and 186, but the numbers of which are readable from inside the housing. With this screen an operator is able to view the horizontal and vertical scales from either side of the screen, but in viewing the scales from one side of the screen, he observes only the scale which is readable from that side.

In order to accurately determine the center of intensity of a headlight beam focused on the screen by the lens 160, and determine the displacement of the "hot spot" from a correctly aimed headlight's center line, pointer means are provided which are located adjacent the screen and are movable in angularly related directions to overlie the center of intensity, with the positions of such pointer means relative to the horizontal and vertical scales 184 and 186 being noted in determining the displacement of the "hot spot" from the position at which it should lie if the headlight was properly aimed. Such pointer means is disclosed herein in two embodiments. The preferred embodiment is shown in Figs. 3, 5, and 8, while the alternative embodiment is shown in Figs. 9 and 10.

The preferred embodiment of the pointer means includes a pair of angularly related transparent colored light filters or pointers 202 and 204 disposed inside the housing adjacent the screen, and movable to positions intercepting the light focused on the screen by lens 160. Pointer 202 extends horizontally from opposite sides of the screen and is of a blue tint. It is mounted on supporting mechanism for movement vertically behind the screen inside the housing. Such supporting mecahnism includes a pair of vertically extending spaced apart guide rods 206 and 208 disposed adjacent a side wall of the housing and mounted in bosses 210 formed in the bottom and top of the housing. Mounted for slidable movement on the rods is a pointer carrying bracket 212 provided with a horizontal slot 214 adapted to receive the angularly bent end 216 of a pivotally mounted actuating rod 218. The opposite end of rod 218 is secured to the stem of a knob 220. The knob is located outside of the housing, and a spring washer 222, disposed between the knob and the housing, holds the rod 218 in determined adjusted positions. The pointer 202 may be formed of plastic, angularly bent as at 224 and secured to the bracket 212 as by means of a bolt or the like 226. Upon rotation of knob 220, the pointer 202 is carried upwardly or downwardly behind the screen. With a headlight beam focused on the screen, the movements of the pointer are clearly visible, casting a blue band of light on the screen.

The other pointer 204, which may also be formed of transparent plastic, is of a green tint and is mounted for both rotatable and horizontal movement adjacent the screen inside the housing. A supporting rod 228 extends transversely through the housing adjacent the lower edge of the screen and spaced inwardly from the filter-pointer 202. A pair of bolts 230 extend through the rod and through the angularly bent end 232 of the pointer 204 overlying the rod, and through a stop member 234 disposed upon the opposite side of the rod from the end 232 of the pointer, to secure the stop member and pointer to the rod. The stop member 234 is adapted to abut at opposite ends the sides of the housing to limit the axial shiftable movement of the supporting rod 228, and thereby prevent interference of pointer 204 with the pointer supporting bracket 212.

The rod 228 is also rotatable from the position shown to a position in which the pointer 204 lies substantially parallel to the floor of the housing and out of the light path of a headlight beam focused on the screen by lens 160. A description of the operation of this pointer mechanism is deferred to the description of the complete operation of the tester.

The alternative embodiment of the pointer means which is shown in Figs. 9 and 10 comprises a pair of angularly related shiftably mounted horizontally and vertically extending pointer wires 248 and 250, disposed adjacent each other and adjacent the screen 162. Wire 248 is supported for vertical movement behind the screen on a threaded rod 252 extending vertically along one edge of the screen. A bracket 254, threadedly coupled to the rod 252, and shiftable therealong upon rotation of the rod by knob 256, carries the wire pointer 248. A second threaded rod 258, extending transversely of the housing adjacent the upper edge of the screen, dependingly carries by means of threadedly coupled bracket 260, the pointer wire 250. Upon rotation of rod 258 by means of knob 262, the bracket 260 is moved along the rod carrying the pointer 250 in a horizontal direction. Upon illumination of the screen by a headlight disposed in front of lens 160, the two pointers 248 and 250 are clearly visible upon the screen. A description of the operation of this alternative pointer means is deferred to the complete description of the operation of the tester.

Also disposed within the housing and extending transversely thereof is a rotatably mounted filter-reflector supporting rod 236, one end of which is provided with a knob 238 on the outside of the housing. A spring washer 240, disposed between the knob and the housing, is adapted to hold the rod in determined positions of rotation. Mounted upon the rod by means of bolts 242 is a filter-reflector 244 which may be formed of transparent plastic or glass having a blue tint. A stop 246, upstanding from the floor of the housing, is adapted to limit the pivotal movement of the filter reflector. This filter reflector serves two purposes, only one of which is now described, the other purpose being described in connection with the candle power testing means forming a portion of the tester. With the filter-reflector 244 in the position shown in Fig. 3, the light passing from the lens 160 to the screen 162 is intercepted and only the blue wave length light rays are permitted to reach the screen. This serves to reduce the bright light that would otherwise result on the screen, and which would be very fatiguing for an operator testing many headlights over a short period of time. The filter-reflector, however, may be pivoted to a position in which it lies substantially parallel with it resting upon the floor of the housing, and in this position it is out of the path of the light focused on the screen by lens 160. The stop 246 limits the rotation of the filter reflector in the opposite direction and prevents interference by the filter reflector with the operation of the supporting mechanism for the filter-pointers herein-above described.

Mounted on the floor of the tester beneath the transparent plate 164 is the floor slope compensator 166 hereinabove mentioned. This compensator is adapted to correct for the slope of the floor of the testing station in which the tester is used. The compensator includes a bubble tube and holder 264 mounted at opposite ends upon vertically disposed threaded pins 266 and 268 upstanding from the floor of the housing. An indicator plate 270, suitably marked as shown, is mounted upon needle pin 268 for rotation therewith, and with the pointer 182 overlying the periphery of the plate. Pin 268 extends through the floor of the housing and is provided therebeneath with an adjustment knob 272. In initially assembling the tester head, the head is disposed with its center line, viz: an imaginary line extending from the center of the lens to the center 188 of the screen, lying in a horizontal plane, and with the pin 268 turned to a position such that the "O" indicia on the plate 270 directly underlies the pointer 182. The needle pin 266 is then adjusted so that the bubble in the bubble tube is centered between the level marks on the bubble tube. Thereafter the setting of pin 266 should never be disturbed, and any suitable means for preventing tampering with this pin may be provided. To hold the bubble tube and its holder upon the pins 266 and 268, a Y-shaped spring 274 is provided, the opposite ends of which are wrapped about the opposite ends of the bubble tube holder, with the base portion of the spring secured to the floor of the housing by a screw or the like 276. By virtue of this spring 274 the bubble tube may be tilted with respect to the housing, and its engagement with the sharp ends of the pins 266 and 268 is constantly assured. The operator uses this floor slope compensator preparatory to making a test of a vehicle's headlights as explained hereinafter.

Means are also provided for quickly and accurately determining the candle power of a headlight being tested for accuracy of aim. Such means are shown particularly in Figs. 2, 3, and 4, and include a light bulb 278, a potentiometer or rheostat 280, operable by a knob 282, a current measuring device 284 similar to a voltmeter but differently calibrated, a source of electric current such as a mercury battery 286, and an electric circuit comprising a plurality of lead wires or electric connectors 288 with which all the above elements are electrically connected together. Such candle power testing means also includes the reflector filter 244.

The light bulb 278 is disposed in a well 290 formed in the rear sight 292. Another well 294 in the rear sight, adjacent the first well, opens downwardly through the top of the housing as at 296 in Fig. 4. A pair of translucent screens or films or the like overlie the open upper ends of the wells with the film 298 in the light bulb well of the same color as the film 300 in the light receiving well 294. The film 300 is of the same color as the filter reflector 244. The light density of the films 298 and 300 may vary, however, as hereinafter explained.

Electric lead 288-a connects one terminal of battery 286 with one side of the potentiometer 280, and the electric connector 288-b connects the other side of the potentiometer with the light bulb 278. The connector 288-c completes a circuit from the bulb to the other pole of the battery. The current measuring device, which measures the drop in potential across the light bulb and is calibrated in terms of candle power as hereinafter described, is connected in parallel with the bulb by the pair of connectors 288-b and 288-e. As the amount of current that flows to the bulb is varied by the potentiometer, the meter 284 will reflect a proportionate change by its sweep hand (not shown).

The filter reflector 244 may be pivoted to a position such that it intercepts the light passing from the lens 160 to the screen 162, and may be moved to such a position of interception of the light that it will reflect a portion of the light upwardly toward the film 300 in the light receiving well. Adjustment of the filter reflector in the path of the light from the lens to the screen 162 will result in the determination of a location for the filter reflector that deflects or reflects the greatest amount of light toward the film 300. When the filter reflector is disposed in this position, a position hereinafter termed the candle power testing position or position of maximum deflection, the potentiometer is then adjusted to balance the intensity of light from the bulb with the intensity of the light on the film 300. When the light on the two films is in balance, the meter 284 is observed and the candle power of the headlight read therefrom.

This meter 284, which is of a commercially available voltmeter type and therefore not described in detail, is provided with a face reading in terms of candle power, instead of volts. The amount of current flowing through the meter determines the position of a sweep hand that moves over the calibrated face of the meter. With the filter reflector disposed in its position of maximum deflection, a definite proportion of the total light intensity traveling from the lens 160 to the screen 162 is deflected onto the film 300. This proportion remains constant throughout varying headlight beam intensities, and therefore the brightness of the light on film 300 may be used as an indication of the total light intensity for any particular headlight being tested.

To initially set the candle power measuring device to read the candle power of headlights accurately, a headlight of known candle power is placed in front of lens 160, and with the filter reflector in the candle power testing position, the light visible in screen 300 is balanced with the light from bulb 278 by operation of the potentiometer. When the light on each film is balanced with the other, the meter is observed. If the meter does not indicate the known candle power of the headlight, the film in either or both of the wells may be replaced by darker or lighter films until the light in the wells is balanced when the meter reads the known candle power of the headlight. Of course, the meter must be properly calibrated to read different candle powers accurately, but the initial setting of the meter is as outlined. Thereafter, the films are cemented or otherwise permanently secured in place.

Before the tester is used to test motor vehicle headlights it must be compensated for the slope of the garage floor at the testing station. This floor slope, after being determined, may be permanently and conveniently marked on the station, as, for example, on the floor or the wall thereof. To determine the floor slope, a pair of upright members are placed on the floor spaced apart and in approximate alignment with the center line of a vehicle as it would be positioned in the testing station, and in approximate alignment with the position of the front and rear axles of such vehicle. These uprights should be of the same length. The tester head is then raised or lowered, with the stand mounted on the track, and is tilted about its transverse axis by means of the leveling screw 110, until a line of sight over the crosses 161 and 188 in the lens and screen respectively falls along a line over the top of the upright members. This line of sight will be parallel with the floor. Thereupon the operator observes the bubble tube of the floor slope compensator, and if the bubble therein is displaced from the center markings on the bubble tube, the knob 272 is adjusted to compensate for the displacement and the bubble located at the center markings. The amount that the needle pin 268 must be turned to compensate for the floor slope is indicated by the relationship of the markings on the indicator plate 270 to the pointer 182. This numeral relationship is the figure that should be permanently marked on the testing station. The same procedure should be followed at the different testing stations in the garage so that the tester may be moved from one station to another for use in testing headlights of vehicles in the various stations.

In the operation of the tester to test motor vehicle headlights, the motor vehicle is driven into the testing station and positioned such that the headlights thereof are spaced slightly from the lens end, or forward end, of the tester head when the same is positioned in front of the headlights. The center line of the vehicle should be substantially perpendicular to the track 136 along which the tester is guided for movement. Assuming that the floor slope of the testing station has already been determined, as above outlined, the floor slope compensator knob 272 is turned to set the proper setting of the plate 270 with respect to pointer 182. Then by means of the vertical leveling screw 110 the tester is tilted about its transverse axis until the bubble in the floor slope compensator bubble tube is properly centered on the center markings. When this is accomplished, the center line of the tester, as hereinabove defined, is aligned with the slope of the floor upon which the vehicle rests. Once the tester has been thus compensated for the floor slope it may be used repeatedly in the same testing station without adjustment for floor slope to test the headlights of all vehicles positioned in the station as aforesaid.

The operator then moves the tester to the center of the vehicle, by rolling the tester along the track, and sights down the center of the hood or over the roof of the vehicle through the front and rear sights 180 and 292. The tester head is swung about the vertical pivot of the bolt 85, until the tester head is properly aligned to the center line of the vehicle. The pointer 94 is then moved relative to the tester head so that the pointer registers with the "O" marking on the indicator plate 102. Thereafter the operator may check the position of the pointer 94 during the testing of the headlights to ensure that the tester head is properly aligned with the vehicle. With each vehicle positioned in the testing station, this alignment of the tester with the center line of the vehicle is repeated.

The tester is then moved along the track to a position in front of one of the vehicle headlights. A description of the test of one headlight will suffice for both, or for fog lights. The head 20 is raised or lowered as necessary, and the operator sights along the peripheral notches in the screws 168 at the sides of the housing, and aligns the notches with substantially the center of the headlight at one peripheral side edge thereof. The tester is now in position for testing the headlight.

The headlight is turned on and lens 60 focuses the headlight beam on the screen 162. The operator may wish to eliminate the glare on the screen and so may swing the filter reflector 244, by means of knob 220, to the position shown in Fig. 3. The light on the screen will now be a blue light. Upon observing the screen, an elliptical or circular spot 200 of intense light will be noted. Whether the spot is elliptical or circular depends upon the type of headlight being tested, but most headlights today are designed to throw a vertically narrow and horizontally wide beam, as such a beam more fully illuminates the roadway. Assuming that it is now desired to test the aim of the headlight beam, and employing the preferred embodiment of the pointer means, the operator rotates knob 220 to raise and lower the blue filter pointer 202. He positions the pointer with respect to the elliptical or circular intense spot or "hot spot" of the light on the screen such that the intensity of the light at the upper and lower edges of the pointer are substantially balanced. It is not the area of light above or below the pointer, but rather the intensity of the light at such edges that is balanced. Because the pointer is transparent and casts a blue band of light on the screen, the intensity of the light at the upper and lower edges may be easily balanced. The pointer 202 is provided with a dark center line 203 that extends along the middle of the pointer. This line, as shown in Fig. 8, for the hot spot 200, lies at substantially the —8″ mark on the right hand scale 186. The operator then knows that the center of intensity of the headlight is 8″ below the center line on an imaginary screen 25 feet from the headlight. This center line is disposed above the floor a distance equal to the distance that the center of the headlight is disposed above the floor. Specifications for the aim of motor vehicle headlights in most all the state laws and as recommended by automotive manufacturers are determined with reference to a screen 25 feet from the headlights. If the specifications call for the beam to be, for example, three inches below the center line, then the operator adjusts the headlight on the vehicle until the hot spot lies at the 3″ mark below the center line on the screen 162. After the proper vertical position of the hot spot is reached, the pointer 204 is moved to a position that will not interfere with the next step of determining the horizontal displacement of the light beam.

To determine such horizontal displacement, the operator rotates the pointer rod 228 to swing the green pointer 204 up to a position intercepting the headlight beam. The rod is then shifted axially until the intensity of light at the vertical edges of the green pointer is in balance. When the pointer is so positioned, the operator notes the horizontal displacement of the beam by reference to the center line 201 on the green pointer and the horizontal scale 184 at the bottom of the screen. The hot spot 200 in Fig. 8 is about 12 inches to the left (or 12 inches to the right of the vehicle). If this displacement is improper, the operator then adjusts the displacement at the vehicle headlight until the beam is properly aimed.

The position of the center of intensity of the beam or hot spot on the screen may be referred to as its co-ordinate position, having reference to the scales 184 and 186. The hot spot is shown in Fig. 8 at 200 as having a co-ordinate position at substantially 8 inches below and 12 inches to the right of the vehicle, or 12 inches to the left side as viewed in the screen. Generally the aim of a headlight is indicated as so many inches above or below the center line and so many inches to the right or left of the vehicle as considered when looking in the direction that the vehicle faces.

The two different colors of the horizontal and vertical pointers 202 and 204 facilitate the determination of the location of the center of intensity of the beam. Not only can the operator see the entire hot spot because the pointers are transparent, but he also comes to associate the different colors of the pointers with the horizontal and vertical coordinate position of the light beam and therefore confusion is eliminated.

In the use of the alternative embodiment of the pointers shown in Figs. 9 and 10, the pointer wires 248 and 250 are positioned to extend along the major and minor axes of the ellipse, and then the coordinate position of the hot spot is read on the horizontal and vertical scales. However, with the use of the alternative embodiment the intensity of light cannot be as accurately balanced on opposite sides of the pointer wires as with the filter-pointers 202 and 204, and therefore greater care must be exercised by the operator when the alternative embodiment of the pointers is used in a tester head.

To test the candle power of the headlight, the filter reflector is positioned in the candle power testing position above described, and the light beneath films or screens 298 and 300 is thereupon balanced through use of the potentiometer, and the candle power is read directly from the meter 284.

What I claim is:

1. A headlight testing instrument comprising: an elongated housing closed on all sides but open at opposite ends, a translucent screen in one of said open ends, a light condensing lens in the opposite end of the housing and adapted to focus on the screen, pointer means mounted for shiftable movement inside the housing adjacent the screen and including horizontally and vertically disposed light filters of different colors movable to intercept light focused on the screen by the lens, whereby one filter casts a band of light of one color on the screen and the other filter casts a band of light of a different color on the screen, and a scale mounted adjacent the paths of movement of the pointer means and adjacent the horizontal and vertical dimensions of the screen whereby the position of the intersection of the differently colored light bands on the screen as rendered by the differently colored filters may be determined with reference to any predetermined point on the screen.

2. A headlight testing instrument comprising: an elongated housing closed on all sides except at the two opposite ends, a translucent screen in one end of the housing, a light condensing lens in the opposite end of the housing and adapted to focus upon the screen, a pair of angularly related members extended from opposite sides of the screen and mounted for shiftable movement along horizontal and vertical axes inside the housing adjacent the screen and movable to intersect one another over the center of light intensity on the screen, each of said members being of transparent material of a color different from the other member whereby different colored angularly related bands of light are cast on the screen, means coupled with said members and extending outside the housing and operable to shift the members across the center of intensity of light focused on the screen to a point of intersection directly overlying the center of such light intensity, a scale extending horizontally and vertically at the edges of the screen and with reference to which the coordinate position of the intersection of the members over the center of light intensity may be determined for comparison with a predetermined coordinate position over which the center of such light intensity should be located.

3. A headlight testing instrument comprising: an elongated housing closed on all sides except at the two opposite ends, a translucent screen in one end of the housing, a light condensing lens in the opposite end of the housing and adapted to focus upon the screen, a pair of angularly related members extending from opposite sides of the screen and for shiftable movement along horizontal and vertical axes inside the housing adjacent the screen and movable to intersect one another over the center of light intensity on the screen, each of said members being of transparent colored material whereby different angularly related colored bands of light are cast on the screen, means supporting said members for shiftable movement along horizontal and vertical axes and including a horizontally extending axially shiftable rod disposed adjacent a horizontal edge of the screen and upon which the vertically extending member is mounted, a scale extending horizontally and vertically at the edges of the screen and with reference to which the coordinate position of the intersection of the members over the center of light intensity may be determined for comparison with a predetermined coordinate position over which the center of such light intensity should be located.

4. A headlight testing instrument comprising: an elongated housing closed on all sides except at the two opposite ends, a translucent screen in one end of the housing, a light condensing lens in the opposite end of the housing and adapted to focus upon the screen, a pair of angularly related members extended from opposite sides of the screen and mounted for shiftable movement along horizontal and vertical axes inside the housing adjacent the screen and movable to intersect one another over the center of light intensity on the screen, each of said members being of transparent colored material whereby different angularly related colored bands of light are cast on the screen, means extending horizontally and vertically inside the housing and supporting the colored members for shiftable movement along horizontal and vertical paths, said means including elements extending outside of the housing and manually operable to shift the members, and a scale extending horizontally and vertically at the edges of the screen and with reference to which the coordinate position of the intersection of the members over the center of light intensity may be determined for comparison with a predetermined coordinate position over which the center of such light intensity should be located.

5. A head light testing instrument comprising: an elongated housing closed on all sides except at the two opposite ends, a translucent screen in one end of the housing, a light condensing lens in the opposite end of the housing and adapted to focus upon the screen, a colored transparent reflector disposed inside the housing between the lens and the screen and lying at an angle with respect to the light path from the lens to the screen such that a portion of the light passing through the transparent reflector is deflected out of the normal path of the light from the lens to the screen, and a candle power testing device mounted on the housing and adapted to receive the deflected light from the transparent reflector.

6. A headlight testing instrument comprising: an elongated housing closed on all sides except at the two opposite ends, a translucent screen in one end of the housing, a light condensing lens in the opposite end of the housing and adapted to focus upon the screen, a colored transparent reflector disposed inside the housing between the lens and the screen and lying at an angle with respect to the light path from the lens to the screen such that a portion of the light passing through the transparent reflector is deflected out of the normal path of the light from the lens to the screen, a translucent screen disposed in a wall of the housing in the path of the light deflected by the transparent reflector out of the normal path of light from the lens to the first mentioned screen, a light bulb adjacent the second mentioned screen, an electric circuit connected to the light bulb and including a rheostat and a current measuring device calibrated in terms of candle power, whereby the illumination of the light bulb may be balanced with the illumination of the second mentioned screen and the candle power determined directly from the current measuring device.

7. A headlight testing instrument comprising: an elongated housing closed on all sides but open at the opposite ends, a screen in one of said open ends, a light condensing lens in the opposite end of the housing and adapted to focus upon the screen, a vertical and horizontal scale adjacent the screen whereby the center of light intensity on the screen may be determined, a reflector disposed inside the housing in a position to intercept a portion of the light passing from the lens to the screen and reflect such portion out of the normal light path between the lens and the screen, a light bulb disposed adjacent the path of reflected light and connected in a circuit including a rheostat and a source of electric current and a current measuring device calibrated in terms of candle power, whereby upon operation of the rheostat the illumination of the bulb may be balanced with the intensity of the reflected light and the candle power of the light passing from the lens to the screen determined directly from the current measuring device.

8. In a headlight testing instrument, a housing, a lens in one end of the housing, a screen in the opposite end of the housing, a pivotally supported colored transparent filter reflector mounted inside the housing between the lens and the screen for swingable movement from a position out of the light path between the lens and the screen to a position intercepting the light path, said filter reflector being movable to a position intercepting the light path at an angle such that a portion of the light passing from the lens to the screen is deflected out of such path, a second screen disposed in a wall of the housing in the path of the deflected light, an electric light bulb disposed adjacent the second mentioned screen, an electric circuit including a rheostat and a current measuring device calibrated in terms of candle power connected to the light bulb, a source of electric energy connected in the circuit, whereby an operator upon adjustment of the rheostat may balance the illumination of the light bulb with the illumination of the second mentioned screen and read the candle power directly from the current measuring device.

9. A headlight testing instrument comprising: an elongated housing closed on all sides but open at the opposite ends, a screen in one of said open ends, a light condensing lens in the opposite end of the housing and adapted to focus upon the screen, a glare reducing colored light filter disposed between the lens and the screen for movement from a position disposed out of the light path from the lens to the screen to a position intercepting such light path whereby the glare of the light falling on the screen is reduced when the filter is disposed in the second mentioned position, and a scale coextensive with the horizontal and vertical dimensions of the screen and with reference to which scale the co-ordinate position of the center of a light beam focused on the screen by the lens may be determined.

10. A headlight testing instrument comprising: an elongated housing closed on all sides except at the two opposite ends, a translucent screen in one end of the housing, a light condensing lens in the opposite end of the housing and adapted to focus upon the screen, pointer means mounted for shiftable movement along angularly related axes inside the housing adjacent the screen and movable to overlie the center of light intensity on the screen, actuating means coupled with the pointer means and extending outside of the housing and manually operable to shift the pointer means, said pointer means extending across the screen along vertical and horizontal axes and shiftable along such axes to determined positions of intersection over the center of light intensity on the screen, a scale extending horizontally and vertically at the edges of the screen and with reference to which the coordinate position of the intersection of the pointers may be determined, a bubble tube mounted on the housing, Y-shaped spring means supporting the bubble tube at opposite ends with the apex of the Y shape secured to the housing, and adjustment means mounted on the housing and engaging the tube at one end to raise and lower such end relative to the housing.

References Cited in the file of this patent

UNITED STATES PATENTS

| | | |
|---|---|---|
| 1,977,970 | Parks | Oct. 23, 1934 |
| 2,111,585 | Falge | Mar. 22, 1938 |
| 2,244,778 | Horsley | June 10, 1941 |
| 2,288,807 | Kenworthy | July 7, 1942 |
| 2,291,114 | Squyer | July 28, 1942 |
| 2,598,794 | Holmes | June 3, 1952 |
| 2,604,003 | Hermann et al. | July 22, 1952 |
| 2,662,779 | Squyer et al. | Dec. 15, 1953 |